US012801494B2

(12) United States Patent
Jeong et al.

(10) Patent No.: US 12,801,494 B2
(45) Date of Patent: Nov. 17, 2026

(54) MEMORY CONTROLLER COMPRESSING AND STORING DATA, METHOD OF OPERATING THE SAME, AND STORAGE DEVICE INCLUDING THE SAME

(71) Applicant: SK hynix Inc., Gyeonggi-do (KR)

(72) Inventors: Jun Seop Jeong, Gyeonggi-do (KR); Jung Hyun Joh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 68 days.

(21) Appl. No.: 18/934,251

(22) Filed: Nov. 1, 2024

(65) Prior Publication Data

US 2025/0348379 A1 Nov. 13, 2025

(30) Foreign Application Priority Data

May 10, 2024 (KR) ........................ 10-2024-0061868

(51) Int. Cl.
*G06F 11/10* (2006.01)
*G06F 13/16* (2006.01)

(52) U.S. Cl.
CPC ...... *G06F 11/1068* (2013.01); *G06F 11/1016* (2013.01); *G06F 13/1673* (2013.01)

(58) Field of Classification Search
None
See application file for complete search history.

(56) References Cited

U.S. PATENT DOCUMENTS 9,927,998 B2 * 3/2018 Lee ........................ G06F 3/0608
2016/0321135 A1 * 11/2016 Berman ............... H03M 13/611

FOREIGN PATENT DOCUMENTS

KR 10-1824612 B1 2/2018
KR 10-1888074 B1 8/2018

* cited by examiner

*Primary Examiner* — Guerrier Merant
(74) *Attorney, Agent, or Firm* — IP & T GROUP LLP

(57) ABSTRACT

Embodiments of the present disclosure relate to a semiconductor device. According to the embodiments of the present disclosure, a memory controller is capable of efficiently managing error detection data and may include an error detection circuit configured to externally receive write data and a plurality of logical addresses corresponding to the write data, and generate error detection data corresponding to the write data, a data compression circuit configured to compress the write data to generate compression data corresponding to partial logical addresses among the plurality of logical addresses, and a map data controller configured to manage map data including a mapping relationship between the plurality of logical addresses and physical addresses of a memory device, and store physical addresses mapped to the partial logical addresses, the error detection data, and compression information related to the compression data in the map data.

20 Claims, 7 Drawing Sheets

MEMORY CONTROLLER COMPRESSING AND STORING DATA, METHOD OF OPERATING THE SAME, AND STORAGE DEVICE INCLUDING THE SAME

CROSS-REFERENCE TO RELATED APPLICATION

The present application claims priority under 35 U.S.C. § 119(a) to Korean patent application number 10-2024-0061868 filed on May 10, 2024, the entire disclosure of which is incorporated by reference herein.

BACKGROUND

1. Field of Invention

Embodiments of the present disclosure relate to a semiconductor device, and more particularly, to a memory controller compressing and storing data, a method of operating the same, and a storage device including the same.

2. Description of Related Art

A storage device is a device that stores data under control of a host such as a computer, a mobile terminal such as a smartphone or a tablet, or various electronic devices. The storage device may include a memory device for storing data and a memory controller for controlling the memory device.

When the storage device receives data from the host, the storage device may compress and store the data. When the storage device decompresses the compressed data and transmits the decompressed data back to the host, the storage device may perform an error detection operation to check integrity of data. For the error detection operation, the storage device may generate and manage error detection data for original data received from the host.

SUMMARY

Embodiments of the present disclosure provide a memory controller capable of efficiently managing error detection data, a method of operating the same, and a storage device including the same.

According to an embodiment of the present disclosure, a memory controller may include an error detection circuit configured to externally receive write, and generate error detection data corresponding to the write data, a data compression circuit configured to compress the write data to generate compression data corresponding to partial logical addresses among a plurality of logical addresses corresponding to the write data, and a map data controller configured to manage map data including a mapping relationship between the plurality of logical addresses and physical addresses of a memory device, and store physical addresses mapped to the partial logical addresses, the error detection data, and compression information related to the compression data in the map data.

According to an embodiment of the present disclosure, a method of operating a memory controller for controlling a memory device that stores data and a buffer memory that temporarily stores data to be provided to the memory device or data received from the memory device may include externally receiving a write data and a plurality of logical addresses corresponding to the write data, generating error detection data corresponding to the write data, compressing the write data to generate compression data corresponding to partial logical addresses among the plurality of logical addresses, providing the compression data to the buffer memory, storing physical addresses mapped to the partial logical addresses, the error detection data, and compression information related to the compression data in map data, and controlling the compression data to be moved from the buffer memory to the memory device.

Storing in the map data includes storing the mapped physical address in a partial storage area among storage areas allocated to each of the plurality of logical addresses included in the map data and storing the error detection data and the compression information in a remaining storage area except for the partial storage area among the allocated storage areas.

Storing the error detection data and the compression information may include storing the error detection data and the compression information in the map data in response to a compression rate for the write data being greater than or equal to a preset critical value.

According to an embodiment of the present disclosure, a method of operating a memory controller for controlling a memory device that stores data and a buffer memory that temporarily stores data to be provided to the memory device or data received from the memory device may include externally receiving a read request corresponding to a plurality of logical addresses, obtaining physical addresses mapped to partial logical addresses among the plurality of logical addresses from map data, controlling compression data stored in the memory device to move to the buffer memory based on the obtained physical addresses, decompressing the compression data moved to the buffer memory based on compression information stored in the map data, performing an error detection operation on the decompressed data based on error detection data stored in the map data, and externally providing the decompressed data depending on the error detection operation.

According to an embodiment of the present disclosure, a storage device may include a memory device configured to store data, a buffer memory configured to temporarily store data provided from the memory device or data to be provided to the memory device, and a memory controller configured to externally receive write data, generate error detection data corresponding to the write data, compress the write data to generate compression data, control the buffer memory to store the write data, store physical addresses indicating a position where the compression data is stored, compression information related to the compression data, and the error detection data in map data, and control the buffer memory and the memory device to store the compression data.

According to the present disclosure, a memory controller can efficiently manage error detection data.

DETAILED DESCRIPTION

Specific structural or functional descriptions of embodiments according to the concept which are disclosed in the present disclosure are illustrated only to describe the embodiments according to the concept of the present disclosure. The embodiments according to the concept of the present disclosure may be carried out in various forms and should not be construed as being limited to the embodiments described in the present disclosure.

Figure 1:
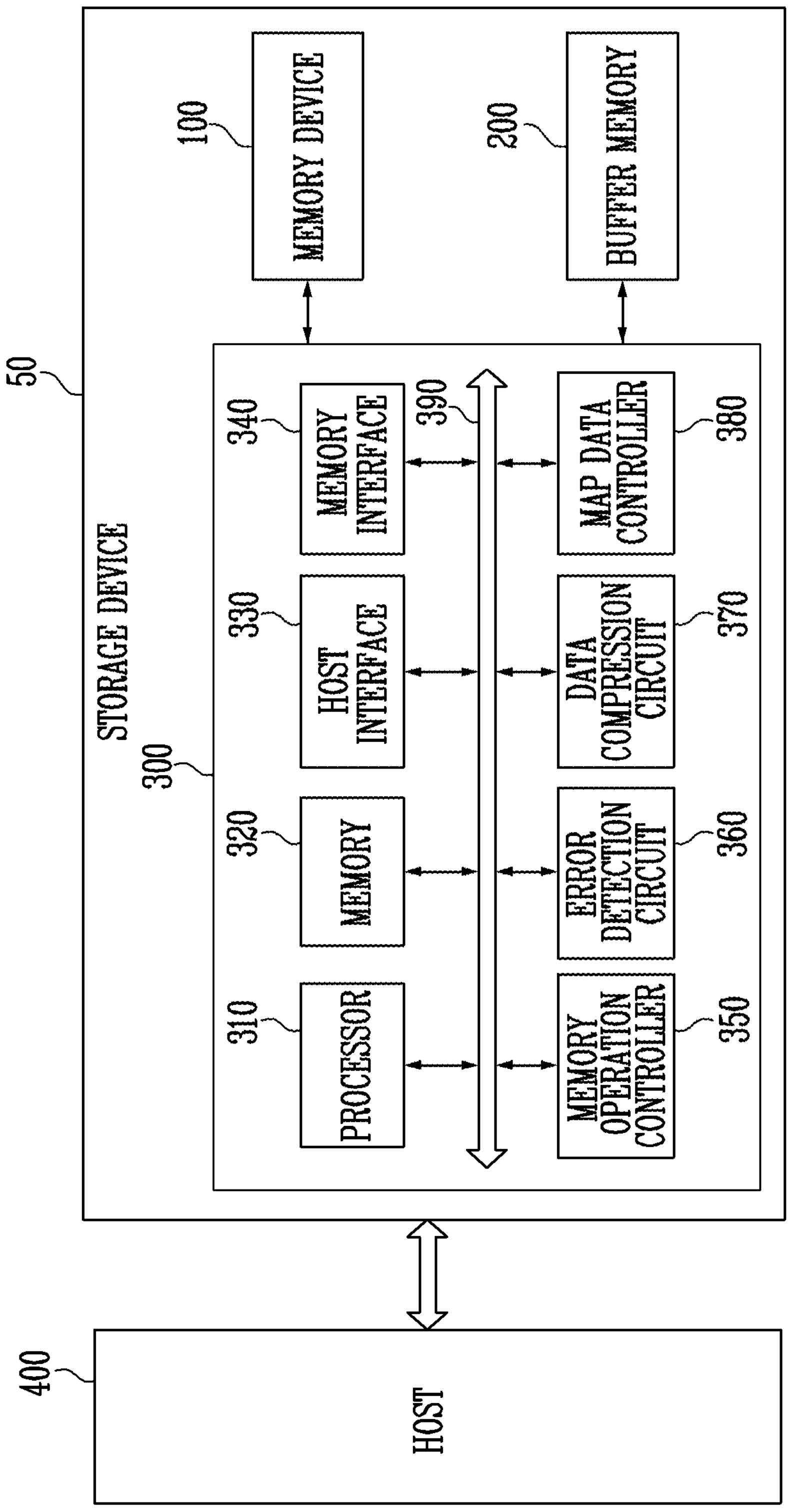
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may be a device that stores data under control of a host 400 such as a cellular phone, a smartphone, an MP3 player, a laptop computer, a server computer, a desktop computer, a game player, a TV, a tablet PC, or an in-vehicle infotainment system.

The storage device 50 may include a memory device 100, a buffer memory 200, and a memory controller 300.

The storage device 50 may be configured as one of storage devices such as an SSD, a multimedia card in a form of an MMC and an eMMC, a universal serial bus (USB) storage device, a universal flash storage (UFS) device, a peripheral component interconnection (PCI), a PCI express (PCI-E) card type storage device, a compact flash (CF) card, a smart media card, and a memory stick.

The storage device 50 may be manufactured as one of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 may include a plurality of memory blocks storing data. Each memory block may include a plurality of memory cells.

In an embodiment, the memory device 100 may be a non-volatile memory in which data is not lost even though power is turned off. For convenience of description, in the present disclosure, the memory device 100 is a NAND flash memory.

In an embodiment, the memory device 100 may receive a command and an address from the memory controller 300. The memory device 100 may perform an operation instructed by a command on an area selected by an address. For example, the memory device 100 may perform a write operation (or a program operation), a read operation, and an erase operation.

The buffer memory 200 may temporarily store data provided from the memory device 100 or data to be provided to the memory device 100.

In an embodiment, the memory device 100 may be a volatile memory in which data is lost when power is turned off. For example, the memory device may be configured of a dynamic random access memory (DRAM), a static random access memory (SRAM), or the like.

The memory controller 300 may control an overall operation of the storage device 50.

When power is applied to the storage device 50, the memory controller 300 may execute firmware. When the memory device 100 is a flash memory device, the firmware (FW) may include a host interface layer (HIL) that controls communication with the host 400, a flash translation layer (FTL) that controls communication between the host 400 and the memory device 100, and a flash interface layer (FIL) that controls communication with the memory device 100.

In an embodiment, the memory controller 300 may receive data and a logical block address (LBA) from the host 400, and may convert the logical block address into a physical block address (PBA) indicating an address of memory cells in which data is to be stored, included in the memory device 100. In the present disclosure, the logical block address and “logic address” or “logical address” may be used as having the same meaning. In the present disclosure, the physical block address and “physic address” or “physical address” may be used as having the same meaning.

In an embodiment, the memory controller 300 may provide the memory device 100 with a command, an address, or data corresponding to a corresponding operation to perform the program operation, the read operation, or the erase operation according to a request of the host 400.

In an embodiment, the memory controller 300 may independently generate the command, the address, and the data and transmit the command, the address, and the data to the memory device 100, regardless of the request of the host 400. For example, the memory controller 300 may provide the memory device 100 with a command, an address, and data for performing a program operation and read operations involved in performing an internal operation such as a wear leveling operation, a read reclaim operation, and a garbage collection operation.

In an embodiment, the memory controller 300 may include a processor 310, a memory 320, a host interface 330, a memory interface 340, a memory operation controller 350, an error detection circuit 360, a data compression circuit 370, a map data controller 380, and a communication bus 390. The processor 310, the memory 320, the host interface 330, the memory interface 340, the memory operation controller 350, the error detection circuit 360, the data compression circuit 370, and the map data controller 380 may communicate with each other through the communication bus 390.

The processor 310 may execute firmware, a code, or one or more commands including various pieces of information required for the memory controller 300 to operate.

The memory 320 may be used as a buffer memory, a cache memory, an operation memory, or the like.

In addition, the memory 320 may store firmware, a code, and one or more commands including various pieces of information required for the memory controller 300 to operate.

The memory controller 300 may communicate with an external device (for example, the host 400, an application processor, or the like) through the host interface 330.

The memory controller 300 may communicate with the memory device 100 through the memory interface 340. The memory controller 300 may transmit a command, an address, a control signal, and the like to the memory device 100 and receive data through the memory interface 340.

The memory operation controller 350 may control an operation of the memory device 100 and the buffer memory 200.

For example, the memory operation controller 350 may generate a command for controlling the memory device 100 and the buffer memory 200. In addition, the memory operation controller 350 may convert the logical address provided from the host 400 into the physical address based on map data.

In addition, the memory operation controller 350 may control the buffer memory 200 to store write data provided from the host 400, compression data obtained by compressing the write data, and the like. In addition, the memory operation controller 350 may control data stored in the buffer memory 200 to be transmitted to the memory device 100 according to the request of the host 400.

In addition, when the memory operation controller 350 receives a read request corresponding to a plurality of logical addresses from the host 400, the memory operation controller 350 may receive read data, the compression data, and the like from the memory device 100 based on a mapped physical address corresponding to a plurality of logical addresses, and may provide the received read data, compression data, and the like to the buffer memory 200.

The error detection circuit 360 may generate error detection data (e.g., parity, CRC data, and the like) corresponding to the write data provided from the host.

In an embodiment, the error detection circuit 360 may perform an error detection operation on the write data based on the error detection data. For example, the error detection operation may be performed using a cyclic redundancy check (CRC) technique. In this case, the error detection data may be CRC data. For example, the error detection circuit 360 may generate the error detection data by performing encoding based on the write data. The error detection circuit 360 may detect an error by performing decoding on the read data or decompressed data based on the error detection data. The error detection circuit 360 may request to provide the decompressed data to the host 400 according to a result of the error detection operation.

In the above-described example, the error detection operation is described as using the CRC technique, but the embodiments of the present disclosure are not limited thereto, and various techniques that may detect an error of data may be used in the error detection operation.

In addition, the error detection circuit 360 may perform error correction when storing data in the memory device 100 or reading data from the memory device 100. For example, the error detection circuit 360 may perform error correction code (ECC) encoding based on data to be written to the memory device 100. Encoded data may be transmitted to the memory device 100. The error correction circuit 360 may perform error correction code decoding on data received from the memory device 100.

The data compression circuit 370 may compress the write data and generate the compression data. The compression data may be stored in the buffer memory 200 and the memory device 100 by the memory operation controller 350.

In addition, the read data read from the memory device 100 may be stored in the buffer memory 200 according to the read request of the host 400. In this case, when it is determined that the read data is compressed the data compression circuit 370 may decompress the read data according to compression information stored in the map data.

The map data controller 380 may manage the map data including a mapping relationship between the logical address provided from the host 400 and the physical address of the memory device 100.

In an embodiment, the map data controller 380 may store the physical address mapped to the logical address corresponding to the compression data, the error detection data, and the compression information related to the compression data in the map data. For example, the map data controller 380 may store the physical address in a portion of a storage area allocated to the plurality of logical addresses corresponding to the write data in the map data and store the compression information and the error detection data in a remainder of the storage area.

The host 400 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
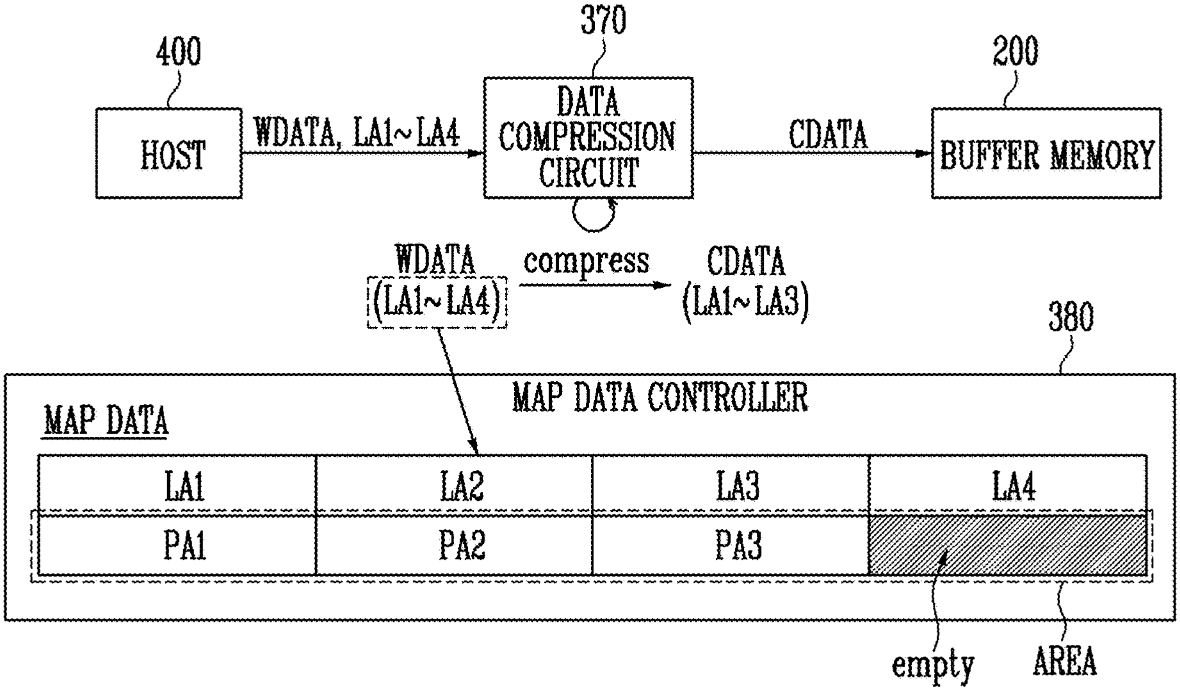
FIG. 2 is a diagram illustrating compressing data according to an embodiment of the present disclosure.

FIG. 2 is a diagram illustrating compressing data according to an embodiment of the present disclosure.

Referring to FIG. 2, when the data compression circuit 370 receives write data WDATA and a plurality of logical addresses LA1 to LA4 corresponding to the write data WDATA from the host 400, the data compression circuit 370 may compress the write data WDATA. The compression data CDATA may be provided to the buffer memory 200.

The data compression circuit 370 may compress the write data WDATA and generate the compression data CDATA corresponding to partial logical addresses LA1 to LA3 among the plurality of logical addresses LA1 to LA4. For example, in FIG. 2 a data compression rate is 25% and a size of data allocated to each logical address is the same. In this case, the data compression circuit 370 may compress the write data WDATA having a size corresponding to the plurality of logical addresses LA1 to LA4 into the compression data CDATA having a size corresponding to partial logical addresses LA1 to LA3. In this case, physical addresses PA1 to PA3 corresponding to the compression data may be mapped to the partial logical addresses LA1 to LA3. The map data controller 380 may store the physical addresses PA1 to PA3 mapped to the partial logical addresses LA1 to LA3 in the map data.

After the mapped physical addresses PA1 to PA3 are stored in a storage area AREA allocated to the plurality of logical addresses LA1 to LA4 in the map data, an empty storage area may be generated. That is, by data compression, a storage area used in the map data may be decreased, and a free storage area may be generated. Therefore, the map data controller 380 may store the error detection data and the compression information in the empty storage area by the data compression. For example, the map data controller 380 may allocate the storage area AREA to each of the plurality of logical addresses LA1 to LA4. The map data controller 380 may store the physical addresses, the error detection data, and the compression information in the storage area AREA allocated to each of the plurality of logical addresses LA1 to LA4.

In an embodiment, the map data controller 380 may store the error detection data and the compression information in the map data when the compression rate for the write data is equal to or greater than a preset critical value. The compression rate and the critical value may be variously set according to an embodiment. When the compression rate for the write data is less than the preset critical value, the error detection data and the compression information may be stored in the memory 320 in the memory controller 300 or the buffer memory 200 rather than the map data.

In an embodiment, the compression rate may be determined according to a predetermined policy and may be information stored in the data compression circuit 370 in advance.

In an embodiment, the map data controller 380 may compare the size of the storage area AREA allocated to the plurality of logical addresses LA1 to LA4 with a size of a storage area corresponding to the physical addresses PA1 to PA3, and check the compression rate for the write data based on a comparison result. In addition, the map data controller 380 may check a size of the storage area that is empty by the data compression based on the comparison result.

In an embodiment, the map data controller 380 may determine a priority of data or information to be stored in the map data according to the size of the storage area that is empty by the data compression. For example, when the size of the empty storage area is greater than or equal to a predetermined size, the map data controller 380 may store the error detection data and the compression information in the map data. As another example, when the size of the empty storage area is less than the predetermined size, the error detection data and the compression information may be stored in the memory 320 in the memory controller 300 or the buffer memory 200 rather than the map data.

In addition, the map data controller 380 may determine a type of the error detection data according to the size of the storage area that is empty by the data compression. For example, the map data controller 380 may store the error detection data of an error detection technique that requires more capacity as the size of the empty storage area increases in the map data.

In an embodiment, when the size of the storage area that is empty by the data compression is greater than the predetermined size, the map data controller 380 may provide information on a remaining area where data is not stored in the storage area AREA to the processor 310 or the host 400. For example, when the data compression rate is set to 50% or more, the map data controller 380 may store the physical address, the error detection data, and the compression information in the map data, and then provide the information on the remaining area where data is not stored to the processor 310 or the host 400. However, in the above-described example, information on the remaining area where data is not stored is provided when the data compression rate is 50% or more, but the embodiments of the present disclosure are not limited thereto. The data compression rate may be variously set according to an embodiment.

An example of storing the physical address, the error detection data, and the compression information in the map data is described in detail with reference to FIGS. 3 to 5.

Figure 3:
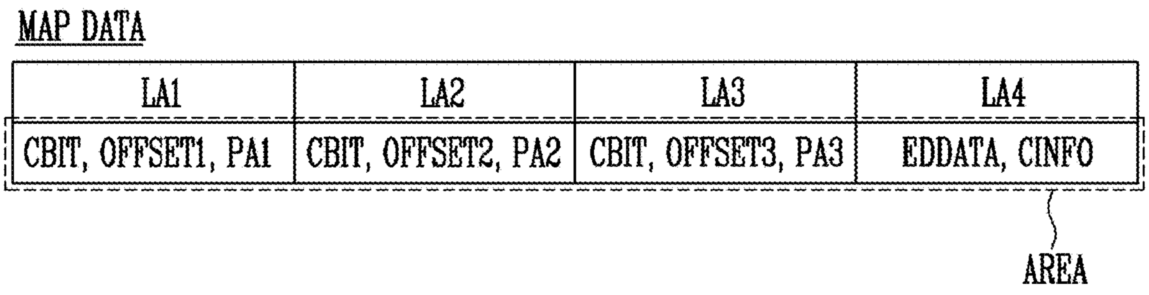
FIG. 3 is a diagram illustrating storing a physical address, error detection data, and compression information in map data according to an embodiment of the present disclosure.

FIG. 3 is a diagram illustrating storing a physical address, error detection data, and compression information in map data according to an embodiment of the present disclosure.

Referring to FIG. 3, in an embodiment, the map data controller 380 may store physical addresses PA1 to PA3 and compression information CINFO in the storage area allocated to the partial logical addresses LA1 to LA3, among the storage area AREA allocated to each of the plurality of logical addresses LA1 to LA4, and may store error detection data EDDATA in the remaining storage area. The compression information CINFO may include at least one of data CBIT indicating whether the write data is compressed and offset data OFFSET1 to OFFSET3 indicating a position where the physical address is stored in the storage area AREA allocated to each of the plurality of logical addresses.

In FIG. 3, the write data may be compressed at a compression rate of 25%.

For example, in the storage area allocated to a first logical address LA1, a first physical address PA1 mapped to the first logical address LA1, the data CBIT indicating whether data stored in the first physical address PA1 is compressed, and first offset data OFFSET1 indicating a position where the first physical address PA1 is stored may be stored. Specifically, when a size of the storage area allocated to the first logical address LA1 is 32 bits, 1 bit may be allocated to the data CBIT, 2 bits may be allocated to the first offset data OFFSET1, and the remaining bits may be allocated to the first physical address PA1. That is, a size of the first physical address PA1 shown in FIG. 3 may be less than a size of the first physical address PA1 shown in FIG. 2 by 3 bits.

In addition, in the storage area allocated to a second logical address LA2, a second physical address PA2 mapped to the second logical address LA2, the data CBIT indicating whether data stored in the second physical address PA2 is compressed, and second offset data OFFSET2 indicating a position where the second physical address PA2 is stored may be stored. Specifically, when a size of the storage area allocated to the second logical address LA2 is 32 bits, 1 bt may be allocated to the data CBIT, 2 bits may be allocated to the second offset data OFFSET2, and the remaining bits may be allocated to the second physical address PA2. That is, a size of the second physical address PA2 shown in FIG. 3 may be less than a size of the second physical address PA2 shown in FIG. 2 by 3 bits.

In addition, in the storage area allocated to a third logical address LA3, a third physical address PA3 mapped to the third logical address LA3, the data CBIT indicating whether data stored in the third physical address PA3 is compressed, and third offset data OFFSET3 indicating a position where the third physical address PA3 is stored may be stored. Specifically, when a size of the storage area allocated to the third logical address LA3 is 32 bits, 1 bit may be allocated to the data CBIT, 2 bits may be allocated to the third offset data OFFSET3, and the remaining bits may be allocated to the third physical address PA3. That is, a size of the third physical address PA3 shown in FIG. 3 may be less than a size of the third physical address PA3 shown in FIG. 2 by 3 bits.

In addition, in a storage area allocated to a fourth logical address LA4, the error detection data EDDATA may be stored. The error detection data EDDATA may be used to detect an error when decompressing the compression data stored in the first to third physical addresses PA1 to PA3. For example, the error detection circuit 360 may generate the error detection data EDDATA through encoding according to various error detection techniques based on the write data. The error detection circuit 360 may detect an error by performing decoding on the read data or the decompressed data based on the error detection data EDDATA.

In an embodiment, the error detection data EDDATA may be data used in various error detection techniques such as CRC, ECC, frame check sequence (FCS), parity check, checksum, header error control (HEC), backward error correction (BEC), and forward error correction (FEC).

In an embodiment, a size of the error detection data EDDATA may be equal to or greater than a size of the storage area allocated to at least one logical address.

In addition, the compression information CINFO may be further stored in the storage area allocated to the fourth logical address LA4.

Figure 4:
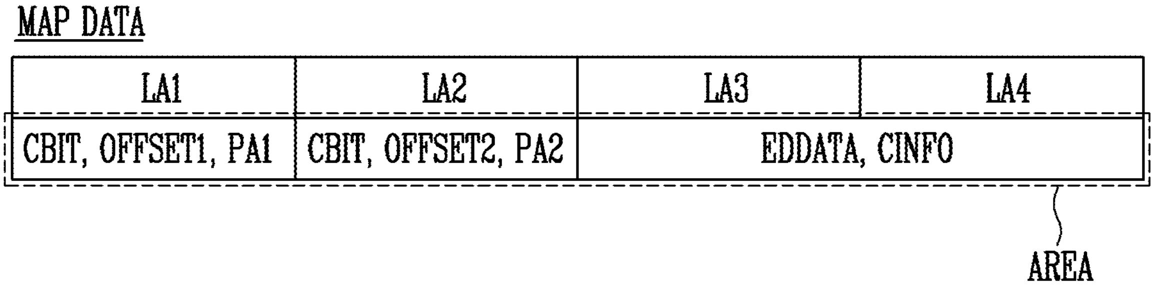
FIG. 4 is a diagram illustrating storing a physical address, error detection data, and compression information in map data according to another embodiment of the present disclosure.

FIG. 4 is a diagram illustrating storing a physical address, error detection data, and compression information in map data according to another embodiment of the present disclosure.

Referring to FIG. 4, write data may be compressed at a compression rate of 50%.

For example, in the storage area allocated to a first logical address LA1, a first physical address PA1 mapped to the first logical address LA1, the data CBIT indicating whether data stored in the first physical address PA1 is compressed, and first offset data OFFSET1 indicating a position where the first physical address PA1 is stored may be stored. Specifically, when a size of the storage area allocated to the first logical address LA1 is 32 bits, 1 bit may be allocated to the data CBIT, 2 bits may be allocated to the first offset data OFFSET1, and the remaining bits may be allocated to the first physical address PA1.

In addition, in the storage area allocated to a second logical address LA2, a second physical address PA2 mapped to the second logical address LA2, the data CBIT indicating whether data stored in the second physical address PA2 is compressed, and second offset data OFFSET2 indicating a position where the second physical address PA2 is stored may be stored. Specifically, when a size of the storage area allocated to the second logical address LA2 is 32 bits, 1 bt may be allocated to the data CBIT, 2 bits may be allocated to the second offset data OFFSET2, and the remaining bits may be allocated to the second physical address PA2.

In addition, in a storage area allocated to a third logical address LA3 and a fourth logical address LA4, the error detection data EDDATA may be stored. The error detection data EDDATA may be used to detect an error when decompressing the compression data stored in the first and second physical addresses PA1 and PA2. As a size of the error detection data EDDATA increases, an error detection accuracy may be increased.

In addition, the compression information CINFO may be further stored in the storage area allocated to the third logical address LA3 and the fourth logical address LA4.

Figure 5:
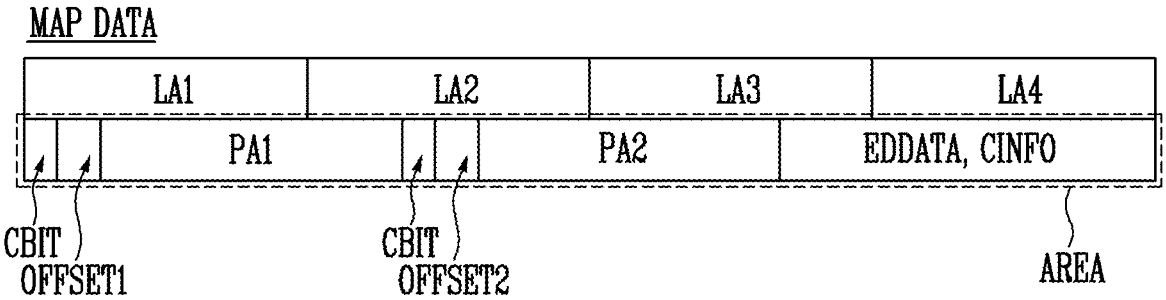
FIG. 5 is a diagram illustrating storing a physical address, error detection data, and compression information in map data according to still another embodiment of the present disclosure.

FIG. 5 is a diagram illustrating storing a physical address, error detection data, and compression information in map data according to still another embodiment of the present disclosure.

Referring to FIG. 5, the map data controller 380 may store the physical addresses PA1 and PA2 in a portion of the storage area AREA allocated to each of the plurality of logical addresses LA1 to LA4, and may store the error detection data EDDATA and the compression information CINFO in a remaining storage area.

For example, the map data may sequentially store data CBIT indicating whether data stored in the first physical address PA1 is compressed or not, the first offset data OFFSET1, and the first physical address PA1. 1 bit may be allocated to the data CBIT, 2 bits may be allocated to the first offset data OFFSET1, and bits corresponding to a size of a storage area allocated to one logical address may be allocated to the first physical address PA1.

In addition, the map data may sequentially store data CBIT indicating whether data stored in the second physical address PA2 is compressed or not, the second offset data OFFSET2, and the second physical address PA2. 1 bit may be allocated to the data CBIT, 2 bits may be allocated to the second offset data OFFSET2, and bits corresponding to a size of a storage area allocated to one logical address may be allocated to the second physical address PA2.

In addition, the map data may store the error detection data EDDATA in a remaining storage area.

In addition, the map data may further store the compression information CINFO in the remaining storage area.

In FIGS. 3 to 5, it is illustrated that 1 bit is allocated to the data CBIT, and 2 bits are allocated to the offset data OFFSET1, OFFSET2, and OFFSET3, but the embodiments of the present disclosure are not limited thereto. For example, the data CBIT may be allocated more than 1 bit, and the offset data OFFSET1, OFFSET2, and OFFSET3 may be allocated more than 2 bits or less than 2 bits.

Figure 6:
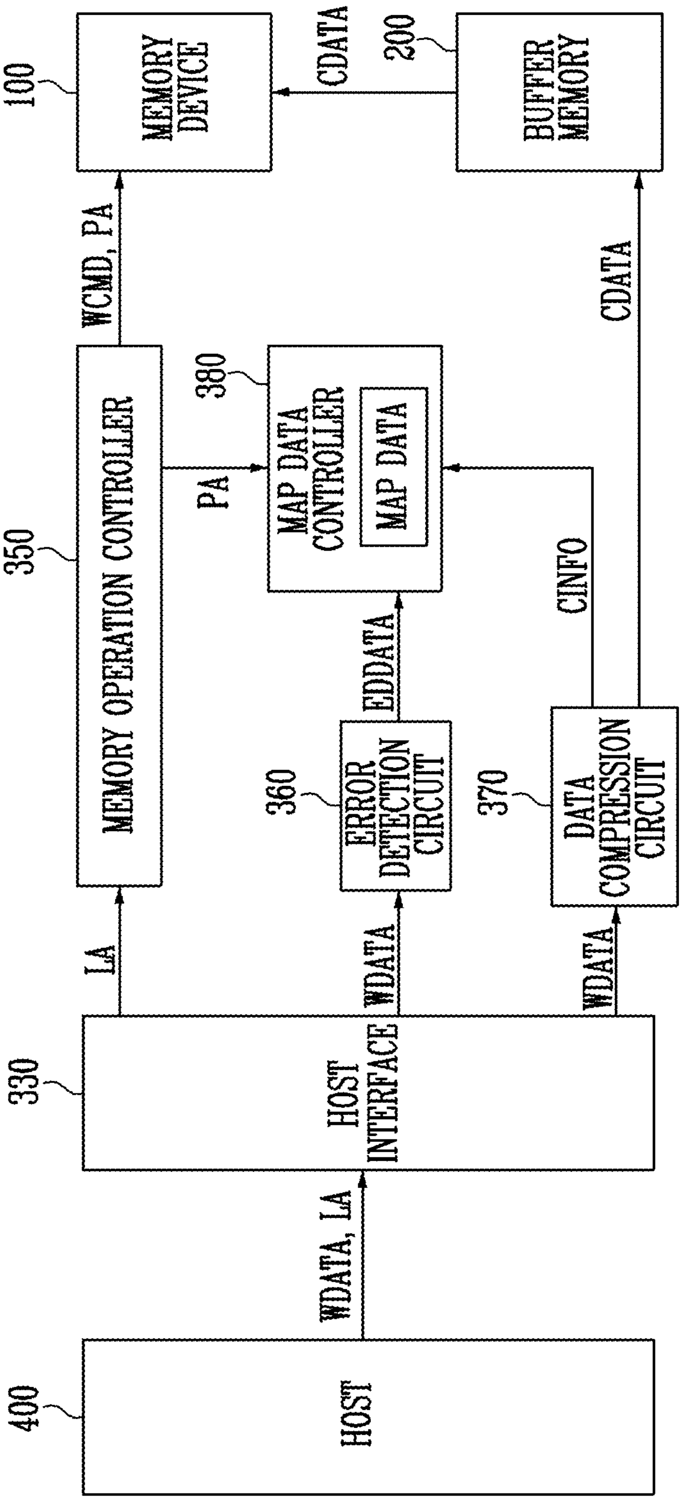
FIG. 6 is a diagram illustrating performing a write operation according to an embodiment of the present disclosure.

FIG. 6 is a diagram illustrating performing a write operation according to an embodiment of the present disclosure.

Referring to FIG. 6, when the write data WDATA and the logical address LA are received from the host 400, the memory operation controller 350 may receive the logical address LA through the host interface 330 and the error detection circuit 360 and the data compression circuit 370 may receive the write data WDATA through the host interface 330.

The error detection circuit 360 may generate the error detection data EDDATA corresponding to the write data WDATA and provide the error detection data EDDATA to the map data controller 380.

The data compression circuit 370 may compress the write data WDATA to generate the compression data CDATA, and provide the compression data CDATA to the buffer memory. In addition, the data compression circuit 370 may provide the compression information CINFO related to the compression data CDATA to the map data controller 380.

The memory operation controller 350 may convert the logical address LA into the physical address PA and provide the physical address PA to the map data controller 380. The physical address PA may correspond to a size of the compression data CDATA.

The map data controller 380 may store the physical address PA, the error detection data EDDATA, and the compression information CINFO in the map data.

The memory operation controller 350 may generate a write command according to a flush request of the host and provide the write command WCMD and the physical address PA to the memory device 100, to control to receive and store the compression data CDATA stored in the buffer memory 200.

Although not shown in FIG. 6, the error detection data may be added and transmitted in a process of transmitting the compression data CDATA between the buffer memory 200 and the memory device 100. The error detection data may be different from the error detection data corresponding to the write data. For example, the buffer memory 200 may generate the error detection data for the compression data CDATA and provide both of the compression data CDATA and the error detection data to the memory device 100 together. The memory device 100 may receive the compression data CDATA and the error detection data, and perform error detection based on the error detection data, thereby checking integrity of the compression data CDATA. In addition, the compression data CDATA may be error correction code encoded by the error detection circuit 360, and the error correction code encoded data may be transmitted to the memory device 100.

In addition, in FIG. 6, the write data is compressed and the compression data is stored in the buffer memory 200, but the embodiments of the present disclosure are not limited thereto. For example, the buffer memory 200 may store the write data, and before transmitting the write data to the memory device 100, the write data may be compressed and then transmitted to the memory device 100.

Figure 7:
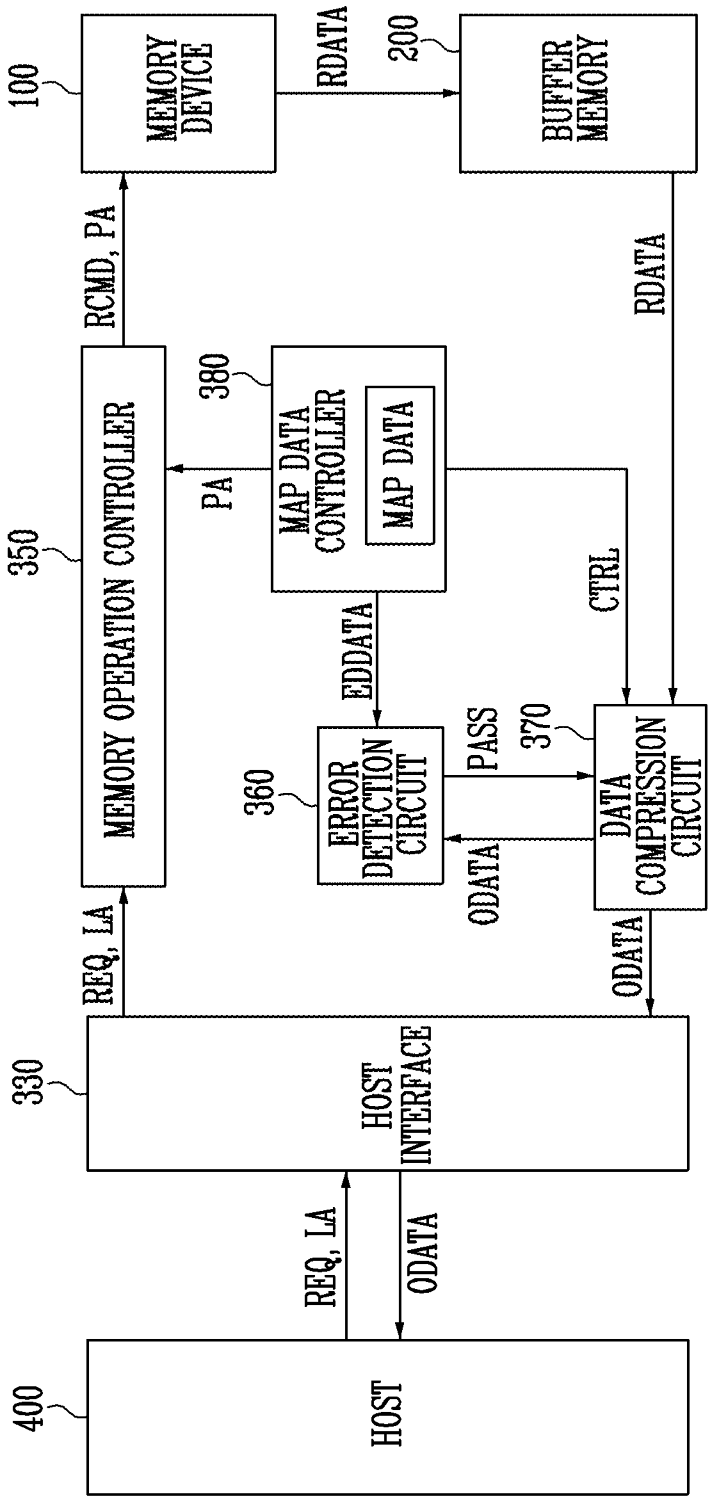
FIG. 7 is a diagram illustrating performing a read operation according to an embodiment of the present disclosure.

FIG. 7 is a diagram illustrating performing a read operation according to an embodiment of the present disclosure.

Referring to FIG. 7, when a read request REQ and a logical address LA corresponding to the read request REQ are received from the host 400, the memory operation controller 350 may receive the read request REQ and the logical address LA through the host interface 330.

The memory operation controller 350 may convert the logical address LA into the physical address PA based on the map data included in the map data controller 380 according to the read request REQ.

The memory operation controller 350 may generate a read command RCMD and provide the read command RCMD and the physical address PA to the memory device 100, to control to transmit read data which is stored in a position indicated by the physical address PA in the memory device 100 to the buffer memory 200.

Although not shown in FIG. 7, the error detection data may be added and transmitted in a process of transmitting the read data RDATA between the buffer memory 200 and the memory device 100. The error detection data may be different from the error detection data EDDATA corresponding to the decompressed data. For example, the memory device 100 may generate the error detection data for the read data RDATA and provide the read data RDATA and the error detection data to the buffer memory 200 together. The buffer memory 200 may receive the read data RDATA and the error detection data, and perform error detection based on the error detection data, thereby checking integrity of the read data RDATA. In addition, the read data RDATA may be error correction code decoded by the error detection circuit 360, and the error correction code decoded data may be stored in the buffer memory 200.

The data compression circuit 370 may decompress the compression data based on the compression information stored in the map data. For example, the data compression circuit 370 may determine whether the read data RDATA is the compression data based on the compression information. Specifically, when the physical address PA is stored together with the compression information, the data compression circuit 370 may determine that the read data RDATA is the compression data. In this case, the data compression circuit 370 may generate original data ODATA by decompressing the read data RDATA.

The error detection circuit 360 may perform an error detection operation on the decompressed data based on the error detection data stored in the map data.

For example, the error detection circuit 360 may perform an error detection operation on the original data ODATA based on the error detection data, and may generate a pass signal PASS when the error detection operation is passed. The error detection circuit 360 may provide the pass signal PASS to the data compression circuit 370. The data compression circuit 370 may provide the original data ODATA to the host 400 through the host interface 330 in response to the pass signal PASS. As another example, when the error detection operation has failed, the error detection circuit 360 may request the data compression circuit 370 to decompress again or to read data from the memory device 100 again. As still another example, when the error detection operation has failed, the error detection circuit 360 may provide a read fail signal to the host 400 through the host interface 330.

Figure 8:
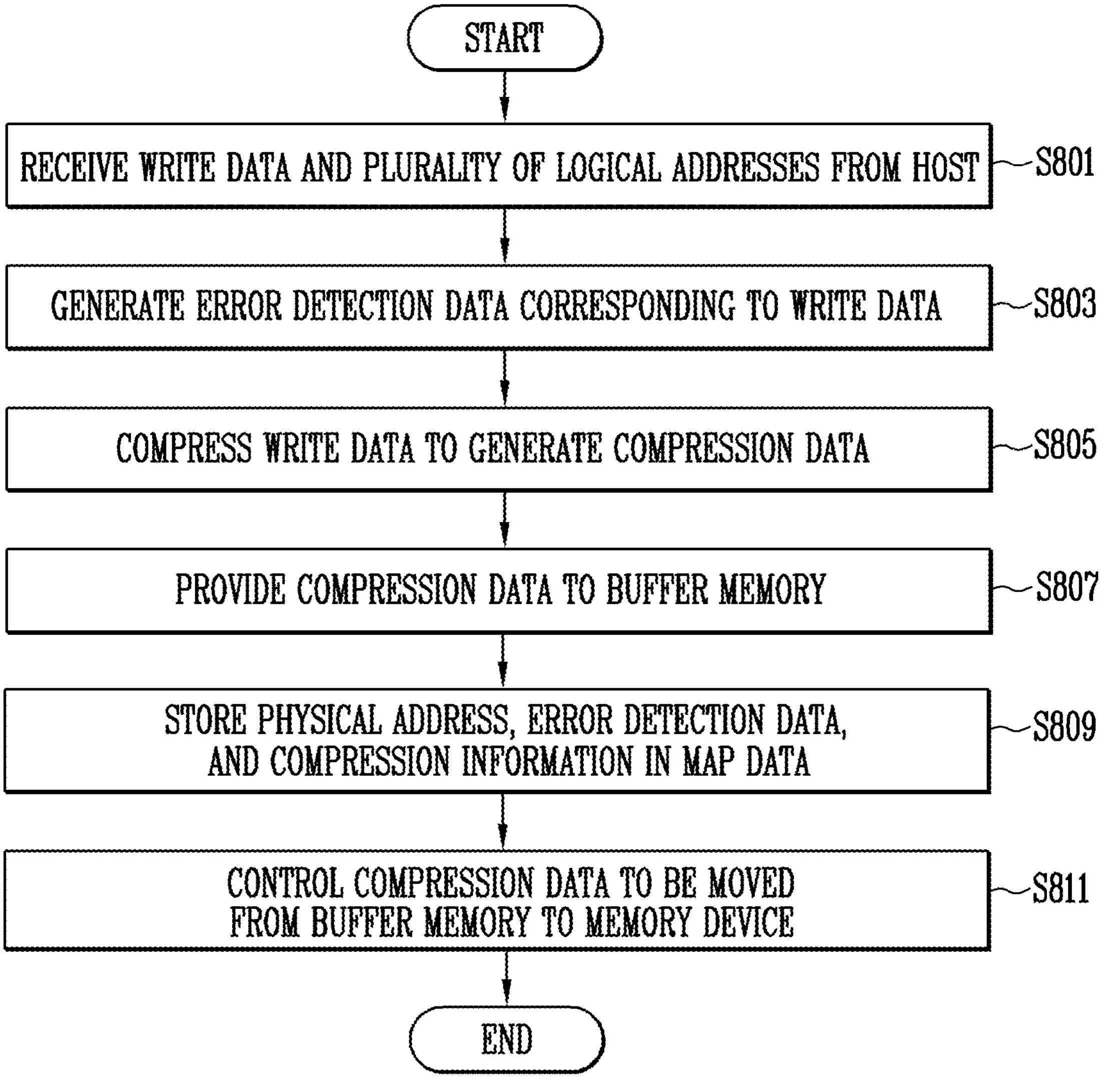
FIG. 8 is a flowchart illustrating a method of operating a memory controller according to an embodiment of the present disclosure.

FIG. 8 is a flowchart illustrating a method of operating a memory controller according to an embodiment of the present disclosure. The method shown in FIG. 8 may be performed, for example, by the memory controller 300 shown in FIG. 1. Specifically, the method shown in FIG. 8 may be a flowchart for describing a method of controlling the write operation by the memory controller 300 according to a write request of the host 400.

Referring to FIG. 8, in operation S801, the memory controller 300 may receive the write data and the plurality of logical addresses corresponding to the write data from the host 400.

In operation S803, the memory controller 300 may generate the error detection data corresponding to the write data.

In operation S805, the memory controller 300 may compress the write data and generate the compression data corresponding to the partial logical addresses among the plurality of logical addresses.

In operation S807, the memory controller 300 may provide the compression data to the buffer memory 200.

In operation S809, the memory controller 300 may store the physical addresses mapped to the partial logical addresses, the error detection data, and the compression information related to the compression data in the map data.

For example, the memory controller 300 may store the physical addresses mapped to the partial logical addresses in the partial storage area of the storage area allocated to each of the plurality of logical addresses included in the map data. The memory controller 300 may store the error detection data and the compression information in the remaining storage area except for the partial storage area of the storage area allocated to each of the plurality of logical addresses.

In addition, the memory controller 300 may store the error detection data and the compression information in the map data in response to a fact that the compression rate for the write data is equal to or greater than the preset critical value.

In operation S811, the memory controller 300 may control the compression data to be moved from the buffer memory 200 to the memory device 100.

Figure 9:
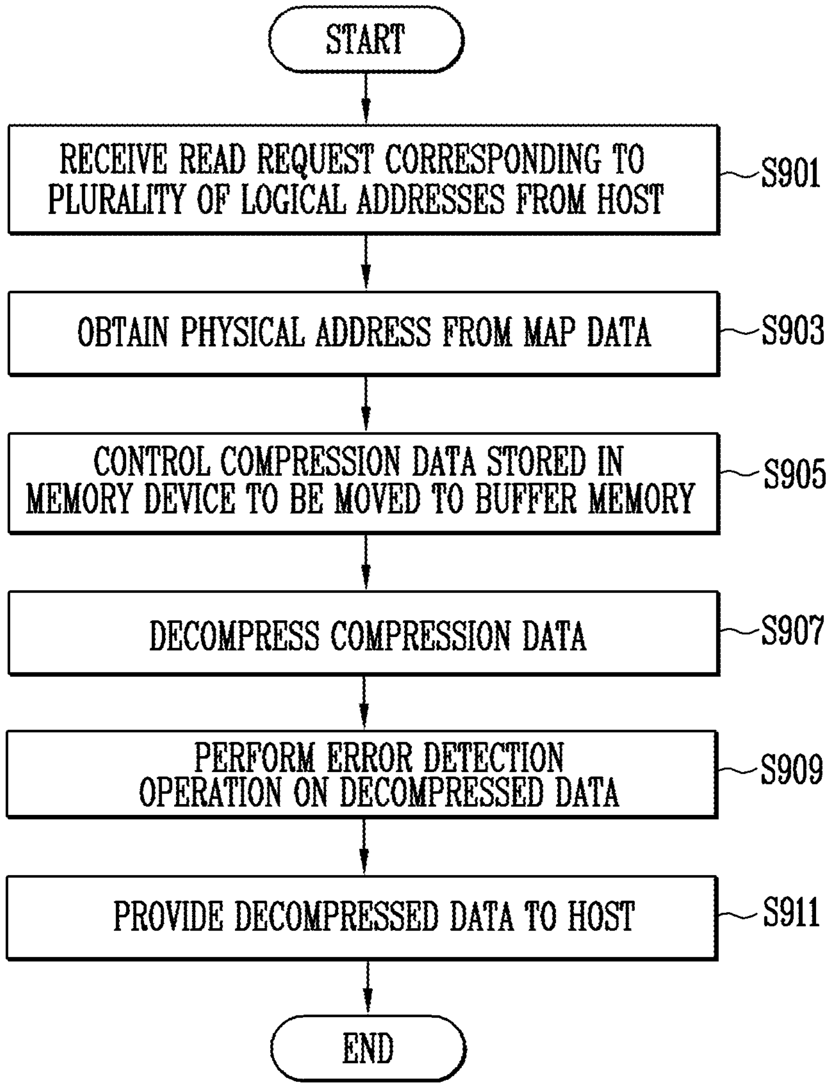
FIG. 9 is a flowchart illustrating another method of operating a memory controller according to an embodiment of the present disclosure.

FIG. 9 is a flowchart illustrating another method of operating a memory controller according to an embodiment of the present disclosure. The method shown in FIG. 9 may be performed, for example, by the memory controller 300 shown in FIG. 1. Specifically, the method shown in FIG. 9 may be a flowchart for describing a method of controlling the read operation by the memory controller 300 according to a read request of the host 400.

Referring to FIG. 9, in operation S901, the memory controller 300 may receive the read request corresponding to the plurality of logical addresses from the host 400.

In operation S903, the memory controller 300 may obtain the physical addresses mapped to the plurality of logical addresses from the map data.

In operation S905, the memory controller 300 may control the compression data stored in the memory device 100 to be moved to the buffer memory 200 based on the obtained physical address.

In operation S907, the memory controller 300 may decompress the compression data moved to the buffer memory 200 based on the compression information stored in the map data.

In operation S909, the memory controller 300 may perform the error detection operation on the decompressed data based on the error detection data stored in the map data.

In operation S911, the memory controller 300 may provide the decompressed data to the host 400 according to the error detection operation.

In accordance with embodiments of the present disclosure, a memory controller can efficiently manage error detection data.

While the embodiments of the present disclosure have been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein. Furthermore, the embodiments may be combined to form additional embodiments.

What is claimed is:

1. A memory controller comprising:

an error detection circuit configured to externally receive write data and a plurality of logical addresses corresponding to the write data, and generate error detection data corresponding to the write data;

a data compression circuit configured to compress the write data to generate compression data corresponding to partial logical addresses among the plurality of logical addresses; and a map data controller configured to:

manage map data including a mapping relationship between the plurality of logical addresses and physical addresses of a memory device, store physical addresses mapped to the partial logical addresses in partial storage areas among storage areas allocated to the plurality of logical addresses in the map data, and store the error detection data, and compression information related to the compression data in a remaining storage area except for the partial storage areas among the storage areas, wherein the remaining storage area is generated based on compression of the write data by the data compression circuit.

2. The memory controller of claim 1, wherein the compression information includes at least one of data indicating whether the write data is compressed and offset data indicating positions where the physical addresses are stored in storage areas allocated to each of the plurality of logical addresses.

3. The memory controller of claim 1, wherein the map data controller is configured to:

allocate storage areas to each of the plurality of logical addresses; and store the physical addresses, the error detection data, and the compression information in the storage areas allocated to each of the plurality of logical addresses.

4. The memory controller of claim 3, wherein the map data controller is configured to:

store the physical addresses and the compression information in partial storage areas allocated to the partial logical addresses, among the storage areas allocated to each of the plurality of logical addresses; and store the error detection data in a remaining storage area except for the partial storage areas allocated to the partial logical addresses, among the storage areas allocated to each of the plurality of logical addresses.

5. The memory controller of claim 3, wherein the map data controller is configured to:

store the physical addresses in partial storage areas among the storage areas allocated to each of the plurality of logical addresses; and store the error detection data and the compression information in a remaining storage area except for the partial storage areas among the storage areas allocated to each of the plurality of logical addresses.

6. The memory controller of claim 1, wherein the map data controller is configured to:

store the error detection data and the compression information in the map data when a compression rate for the write data is equal to or greater than a preset critical value.

7. The memory controller of claim 1, further comprising:

a memory operation controller configured to:

control a buffer memory to store the compression data; and control the buffer memory and the memory device to transmit the compression data from the buffer memory to the memory device according to an external request.

8. The memory controller of claim 7, wherein the memory operation controller is configured to:

receive the compression data from the memory device based on the physical addresses stored in the map data; and provide the received compression data to the buffer memory.

9. The memory controller of claim 8, wherein the data compression circuit is configured to decompress the compression data based on the compression information stored in the map data.

10. The memory controller of claim 9, wherein the error detection circuit is configured to perform an error detection operation on the decompressed data based on the error detection data stored in the map data.

11. A method of operating a memory controller for controlling a memory device that stores data and a buffer memory that temporarily stores data to be provided to the memory device or data received from the memory device, the method comprising:

externally receiving a read request corresponding to a plurality of logical addresses;

obtaining physical addresses mapped to partial logical addresses among the plurality of logical addresses from partial storage areas among storage areas allocated to the plurality of logical addresses in map data;

obtaining compression information related to compression data and error detection data from a remaining storage area except for the partial storage areas among the storage areas, the remaining storage area being generated based on compression of write data;

controlling the compression data stored in the memory device to move to the buffer memory based on the obtained physical addresses;

decompressing the compression data moved to the buffer memory based on compression information stored in the map data;

performing an error detection operation on the decompressed data based on the error detection data; and externally providing the decompressed data depending on the error detection operation.

12. The method of claim 11, wherein performing the error detection operation comprises generating a pass signal in response to a pass of the error detection operation.

13. The method of claim 12, wherein the externally providing the decompressed data comprises externally providing the decompressed data in response to the pass signal.

14. The method of claim 11, further comprising:

decompressing the compression data moved to the buffer memory back in response to a failure of the error detection operation.

15. The method of claim 11, further comprising:

controlling, in response to a failure of the error detection operation, compression data stored in the memory device to be moved back to the buffer memory based on the obtained physical addresses.

16. The method of claim 11, further comprising:

externally providing a read fail signal in response to a failure of the error detection operation.

17. A storage device comprising:

a memory device configured to store data;

a buffer memory configured to temporarily store data provided from the memory device or data to be provided to the memory device; and a memory controller configured to control the buffer memory to externally receive write data, generate error detection data corresponding to the write data, compress the write data to generate compression data, control the buffer memory to store the write data, store physical addresses mapped to the partial logical addresses in partial storage areas among storage areas allocated to the plurality of logical addresses in the map data, store the error detection data, and compression information related to the compression data in a remaining storage area except for the partial storage areas among the storage areas, and control the buffer memory and the memory device to store the compression data, wherein the remaining storage area is generated based on compression of the write data by the data compression circuit.

18. The storage device of claim 17, wherein the memory controller is configured to:

store the physical addresses in a portion of a storage area allocated to a plurality of logical addresses corresponding to the write data in the map data; and store the compression information and the error detection data in a remainder of the storage area.

19. The storage device of claim 17, wherein the memory controller is configured to:

control the memory device and the buffer memory to store read data read from the memory device in the buffer memory according to a read request; and decompress the read data in response to a determination that the read data is compressed according to the compression information stored in the map data.

20. The storage device of claim 19, wherein the memory controller is configured to:

perform an error detection operation on the decompressed data based on the error detection data stored in the map data; and externally provide the decompressed data depending on a result of the error detection operation.

* * * * *